(12) United States Patent
McCarthy

(10) Patent No.: US 7,330,094 B2
(45) Date of Patent: Feb. 12, 2008

(54) ENERGY PRODUCING APPARATUS UTILIZING MAGNETIC PISTONS

(76) Inventor: Michael Patrick McCarthy, 210 21st Ter. SE., Largo, FL (US) 33771

( * ) Notice: Subject to any disclaimer, the term of this patent is extended or adjusted under 35 U.S.C. 154(b) by 67 days.

(21) Appl. No.: 11/435,105

(22) Filed: May 16, 2006

(65) Prior Publication Data

US 2007/0267921 A1 Nov. 22, 2007

(51) Int. Cl.
*H01F 7/02* (2006.01)

(52) U.S. Cl. .......................... 335/306; 310/1

(58) Field of Classification Search ................ 335/306; 310/1
See application file for complete search history.

(56) References Cited

U.S. PATENT DOCUMENTS

| | | | | |
|---|---|---|---|---|
| 2,056,719 | A * | 10/1936 | Gelnaw | 310/23 |
| 3,939,367 | A * | 2/1976 | Ramirez | 310/20 |
| 4,093,880 | A * | 6/1978 | Teal | 310/24 |
| 4,317,058 | A * | 2/1982 | Blalock | 310/24 |
| 4,456,858 | A * | 6/1984 | Loven | 318/138 |
| 4,473,763 | A * | 9/1984 | McFarland | 310/24 |
| 4,751,486 | A | 6/1988 | Minato | |
| 5,057,724 | A | 10/1991 | Patton | |
| 5,219,034 | A | 6/1993 | Wortham | |
| 5,463,263 | A * | 10/1995 | Flynn | 310/181 |
| 5,637,936 | A | 6/1997 | Meador | |
| 6,049,146 | A | 4/2000 | Takara | |
| 6,433,452 | B1 * | 8/2002 | Graham | 310/152 |
| 6,552,450 | B2 * | 4/2003 | Harty et al. | 310/16 |
| 6,784,586 | B2 | 8/2004 | Akemakou | |
| 6,954,019 | B2 | 10/2005 | Sprain | |
| 7,105,958 | B1 * | 9/2006 | Elmaleh | 310/24 |
| 2002/0121815 | A1 * | 9/2002 | Sullivan | 310/33 |

* cited by examiner

*Primary Examiner*—Ramon M. Barrera
(74) *Attorney, Agent, or Firm*—Larson & Larson, P.A; James E. Larson

(57) ABSTRACT

An energy producing apparatus utilizing magnetic pistons is provided. Permanent magnets of like polarity are employed within a cylinder of each piston and upon a top portion of said piston. The like polarity pistons have a natural desire to repel one another. A ferromagnetic slipper unit is inserted into a gap in said cylinder between the permanent magnets of like polarity to interfere with said magnetic repulsive field and to cause a magnetic attractive field. Each piston is attached to a push rod which in turn is attached to shaft and flywheel system. The change in magnetic fields from repulsion to attraction causes the piston to push up and down and turn the shaft and flywheel system. Two pistons in coincidence can be used so that while one piston is repelling, the other is attracting causing an increase in motive power.

20 Claims, 8 Drawing Sheets

ENERGY PRODUCING APPARATUS UTILIZING MAGNETIC PISTONS

BACKGROUND OF THE INVENTION

1. Field of Invention

The present invention relates to a magnetic energy producing apparatus. More particularly, it relates to an engine or generator utilizing magnetic pistons to produce energy by interfering with the repulsive magnetic force of like polarity permanent magnets associated with said pistons thereby moving said pistons.

2. Description of the Prior Art

Magnetism is a phenomenon by which materials exert an attractive or repulsive force upon other materials. Some well known materials that exhibit detectable magnetic properties include iron and steel, a metal alloy whose major component is iron with carbon being the primary alloying material. However, all materials are influenced to a greater or lesser degree by the presence of magnetic fields. Magnetic forces are fundamental forces that occur from the movement of an electrical charge. Accordingly, magnetism is present whenever electrically charged particles are in motion. This can happen from movement of electrons in an electric current, resulting in electromagnetism, or from quantum-mechanical spin and orbital motion of electrons, resulting in what is now known as permanent magnets.

Magnetic fields are made of dipoles, two equal and opposite point charges, and are commonly referred to as the "North pole" and the "South pole" or the positive and negative charged sides. As well known in the prior art, two magnets of like poles repulse one another while two magnets of different poles attract one another. This is because a magnetic dipole tends to align itself in an opposed polarity to that magnetic field, thereby canceling the net field strength as much as possible and lowering the energy stored in that field to a minimum.

As stated before, there are two types of magnets known in the prior art, electromagnets and permanent magnets. Electromagnets rely upon an electric current to generate a magnetic field such that when the current increases so does the magnetic field. The simplest type of electromagnet is a coiled piece of wire, such as a solenoid. The magnetic field is generated when an electrical charge is placed on the wire. A much stronger magnetic field can be produced if said wire is wrapped around a core of paramagnetic or ferromagnetic material, such as iron. The magnetic field produced by the coil causes the core to magnetize and thereby produce an even stronger total magnetic field than that of the coil alone. A very useful type of electromagnetic is that which is seen in junk yards whereby large cranes having an electromagnet attached to a bottom end move over a vehicle to pick it up. By charging the electromagnet, the vehicle is magnetically attracted to the magnet and can be moved and subsequently released by eliminating the charge to the electromagnet. There are some disadvantages to electromagnets, such as when residual magnetization remains from the process of turning the electromagnetic on and off. This is known as hysteresis which can build up (aggregately) to a point such that even when the electric charge is turned off, the magnetic properties of the electromagnet remains present, residually.

Permanent magnets do not rely on an induced electric charge (or other outside influence) to generate a magnetic field. They are simply inherently magnetic due to quantum mechanical spin of the particles (protons, neutrons and electrons) that make up all matter. Because of a phenomenon known as "long range ordering," some materials exhibit a stronger magnetic filed than others. Examples of permanent magnets include Rare Earth or Neodymium magnets, Samarian-Cobalt magnets, Ceramic magnets, Plastic magnets and Alnico magnets.

The use of magnetism to produce energy is known in the prior art. For many years people have been trying to harness the energy associated with magnets and the energy that can be produced from their use in motors, generators and switches. However, much is left to be developed.

The use of magnetism to produce energy is more environmentally friendly (i.e., cleaner), cost effective and more efficient than the use of fossil fuels. Accordingly, there has been a surge in inventions in this technology. There is no doubt that in industrialized countries of the world, and in emerging third world countries, there is an addiction to natural resources. This addiction is no greater than that of the addiction to oil. Countries such as the United States consume as much as 20 million barrels of oil every day. China, currently the fastest growing nation in the world consumes upwards of 6.5 million barrels of oil a day and its consumption is on the rise. But oil, like so many other natural resources, is of a limited quantity. And, its supply and demand is extremely political causing governmental tension and sometimes war. It is likely that the world could be completely devoid of any oil within a hundred years. And the Earth will simply not be able to naturally produce anymore oil for millions of years. Further, fossil fuels are extremely hazardous to the environment and cause huge amounts of waste of which are both volatile and difficult to dispose. So what are people going to do? Most likely, people will look to alternative means of energy production, including, but not limited to hydro-electric, wind and solar. But these forms of energy production can also be limited in that the on-going destruction and manipulation of the environment could have an adverse effect on how we harness these important natural resources. Therefore, many people have looked to use of magnets and magnetism.

Many have attempted to use magnets in motors and generators. Reasons for their use include that they operate cleanly, they are efficient, cost effective, easy to produce or are readily available, and most importantly their use reduces our additive use to fossil fuels, like oil.

One such example of a magnetic energy producing apparatus is U.S. Pat. No. 4,751,486 to Minato wherein a magnetic rotation apparatus is provided with first and second rotors rotatably supported and juxtaposed such that they are rotatable in opposite, but in a cooperating manner. Permanent magnets are employed wherein one magnetic polarity is located radially outward from the rotors while the other magnetic polarity is located inward towards the rotors. The attractive force of the opposite polarities rotates the wheels. An electromagnet can be introduced into the system to change polarities to make the rotors reverse directions. However, this invention fails to appreciate the equal and just as powerful force of repulsion in a system wherein magnets of like polarity are positioned in close proximity to one another for moving an energy producing device. Further, the use of electromagnets to reverse directions complicates the invention and requires an additional power source to apply current to said electromagnets.

U.S. Pat. No. 5,219,034 to Wortham provides for a vehicle having a magnetic motor. The engine block of the motor has multiple cylinders for receiving magnetic pistons attached to a crankshaft and with electromagnets mounted in the engine head for magnetically operating the magnetic pistons by electric current reversal. This invention too complicates the art by introducing a system that requires a current producing device to reverse directions of the pistons. The need to change polarities to affect piston reversal is also inefficient and costly.

U.S. Pat. No. 5,057,724 to Patton has many of the same problems. A plurality of permanently polarized ceramic magnets is located upon a plurality of pistons, each mounted in a cylinder. An electromagnet is located at each end of each cylinder and is energized to alternately attract and repel the ceramic magnet so that each piston is caused to reciprocate in the cylinder under the influence of electromagnetism. The need to enter an energy source to provide a current to the electromagnet is inefficient and complicates this magnet motor. Further, it is known that electromagnets lose some of their magnetic power over time and are not ideal for use in a pure magnetic generating apparatus.

U.S. Pat. No. 6,049,146 to Takara also utilizes a magnetic piston inside of a cylinder. However, in this reference, the cylinder is alternately magnetized by electromagnetism to cause attraction and repulsion moving the piston up and down. Again, electromagnetism is used thereby requiring a more complicated system and a current generating device to apply to said electromagnet. Additionally, hysteresis can occur over-time after use thereof.

U.S. Pat. No. 6,954,019 describes an apparatus and process for generating energy though the use of a rotating shaft that is moved by magnets in a single circular direction. Permanent magnets are disposed about a bottom plate member and work in coincidence with an opposed polarity magnet on a top plate member. An electromagnet is disposed at an end of the row of permanent magnets to operate a continuous flow of said shaft.

Clearly, the prior art demonstrates that magnetic energy producing apparatuses are known, but that there are improvements needed in the art. Too many of the advancements in the art rely upon electromagnets which complicate systems by requiring additional power sources and control mechanisms to switch current in and out of said electromagnets. Further, it is known that electromagnets can degrade in quality (ability to produce a workable magnetic field) over time. There is no suggestion in the prior art to utilize the natural attractive and repulsive magnetic force of permanent magnets with at least two pistons working in coincidence such that while one piston is attracting to a magnetic material, the other piston is repulsing from two magnets of like polarity exposed to one another for moving a flywheel system in one continuous direction. Clearly, the prior art has failed to suggest that the interference of a repelling magnetic field can be used to harness energy.

SUMMARY OF THE INVENTION

I have invented a system that harnesses magnetic field repulsion to create energy through the interference of like polarity magnets. More particularly, I have invented a coincident magnetic combustive engine.

My system is a fuel-less energy producing apparatus that utilizes permanent magnetic pistons. My invention principally works by interfering with a magnetic field within a cylinder wherein pistons are employed and a slipper element is introduced in said cylinder to cause attraction between two permanent magnets of like polarity. At least one magnet is stationary within the cylinder while another is moveable upon the piston. When the slipper is removed, the magnets of like polarity repel one another and move the piston in a direction that causes force upon a push rod which in turn moves a flywheel system and shaft. At least a second piston is working in coincidence and mounted above said first piston and working in the same manner at an opposed force but working to move the flywheel and shaft in the same direction. More particularly, when the slipper is removed from the first piston causing a repelling force in its respective cylinder, the other piston has its slipper introduced. This causes an interference with the repulsion of the like magnets which causes an attraction in its respective cylinder. Regardless of which piston is repelling or attracting, the flywheel is always being forced upon in the same direction.

A timing scheme is also introduced so that any "top dead center" de-acceleration (the moment of least efficiency) is reduced to a non-affecting level or completely eliminated.

BRIEF DESCRIPTION OF THE DRAWINGS

The detailed description of the invention, contained herein below, may be better understood when accompanied by a brief description of the drawings, wherein.

DETAILED DESCRIPTION OF THE PREFERRED EMBODIMENT

Figure 3:
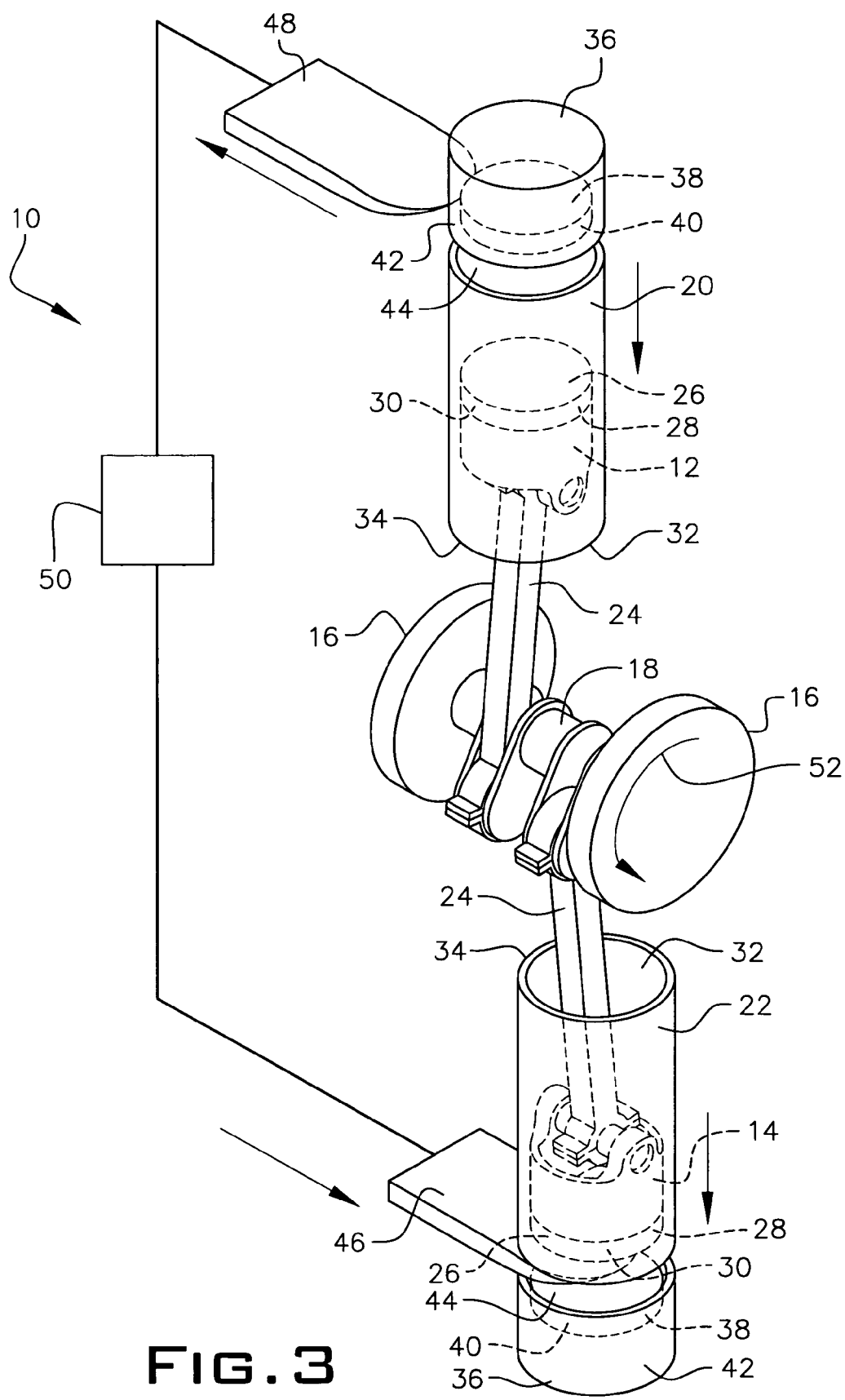
FIG. 3 is perspective view of a coincident two piston system of the present invention illustrating a first slipper unit removed from a top cylinder causing the piston to push downwards due to magnetic repulsion and a second slipper unit introduced (thereby interfering) into a bottom cylinder causing the piston located therein to pull downwards due to magnetic attraction.

Referring to FIG. 3, a coincident magnetic combustive energy producing apparatus 10 is shown. Apparatus 10 includes a first and second piston, 12 and 14, working in coincidence to operate a flywheel system 16 to turn a shaft 18 to produce kinetic energy. First and second pistons, 12 and 14, are moveable within first and second cylinders, 20 and 22 respectively. Pistons 12 and 14 utilize a magnetic field to affect motion and therefore are fuel-less.

As shown in FIG. 3, each piston, 12 and 14, is attached to a push rod 24 which, in turn, attaches at an opposed end to shaft 18. Further, each piston, 12 and 14, have a first permanent magnet 26 mounted on a top end 28 of the piston. Permanent magnet 26 can be attached to piston top end 28 in a variety of manners. For instance, permanent magnet 26 can be integrally welded to piston top end 28. Or, permanent magnet 26 can be attached to piston top end 28 by a clamping mechanism. Still further, permanent magnet 26 could be glued to piston top end 28. However, as practiced in the preferred embodiment, each piston, 12 and 14, has a small hinged door member 30 that swings opens and allows permanent magnet 26 to slide in and be retained thereby.

With continuing reference to FIG. 3, each piston, 12 and 14, are moveable within their respective cylinder, 20 and 22, along an inside channel 32. Push rods 24 enter into channel 32 of cylinders 20 and 22 at open bottom ends 34 thereof. Each cylinder 20 and 22 also has a closed top end 36 wherein a stationary second permanent magnet 38 is employed. Second permanent magnet 38 can also be affixed to cylinder top end 36 in a variety of manners. For example, it can be welded or glued. Or, second permanent magnet 38 can be affixed by a series of small crimp like hands (not shown) that hold it in place. However, in the preferred embodiment, second permanent magnets 38 are held in place by sliding it into an area accessible by a hinged door 40 along an outer circumference 42 of each cylinder 20 and 22.

Figure 1:
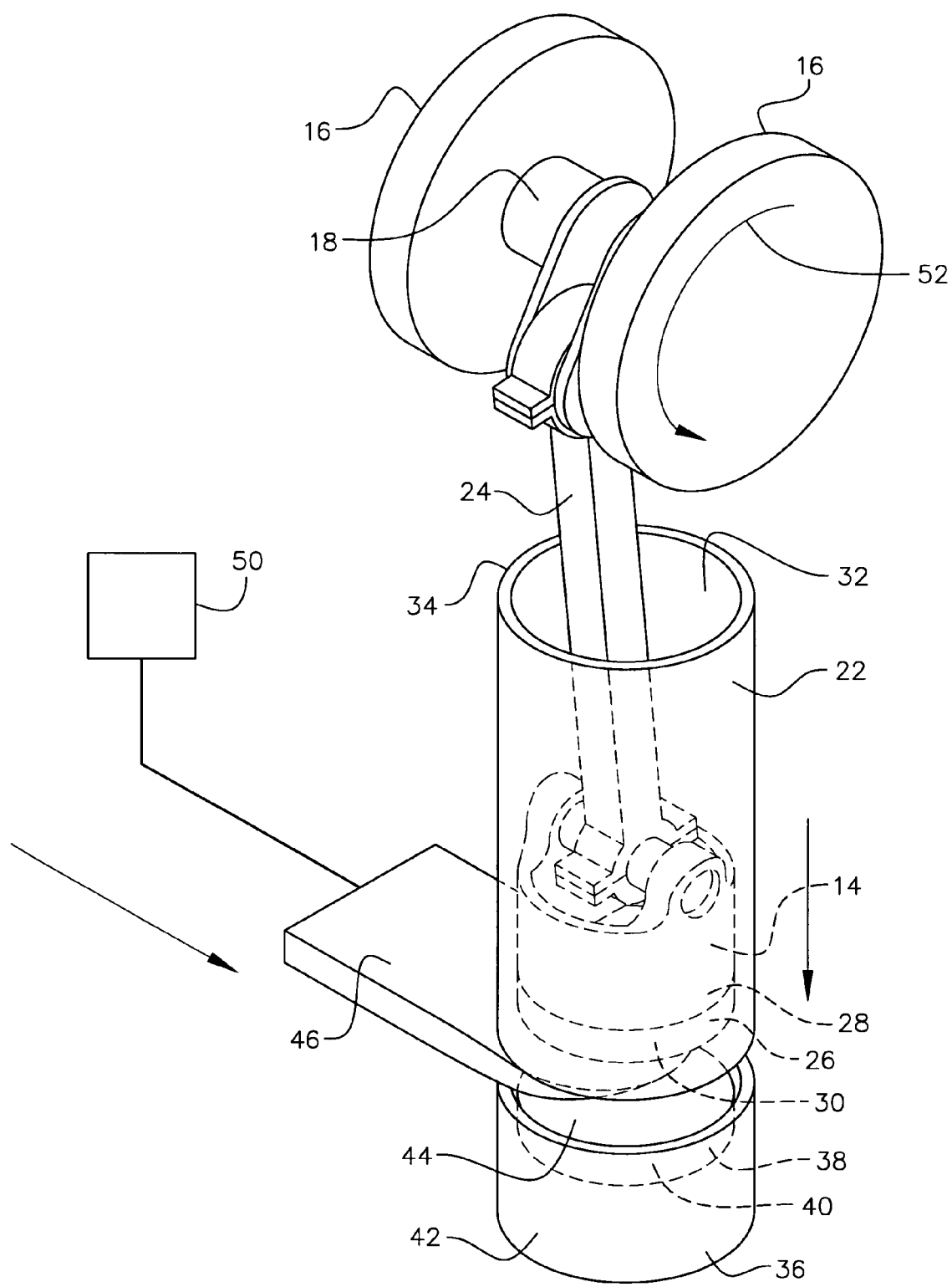
FIG. 1 is a perspective view of a piston of the present invention having a permanent magnetic head portion in proximity to another stationary permanent magnet in a cylinder whereby a slipper unit is introduced between said two permanent magnets causing magnetic attraction.
Figure 2:
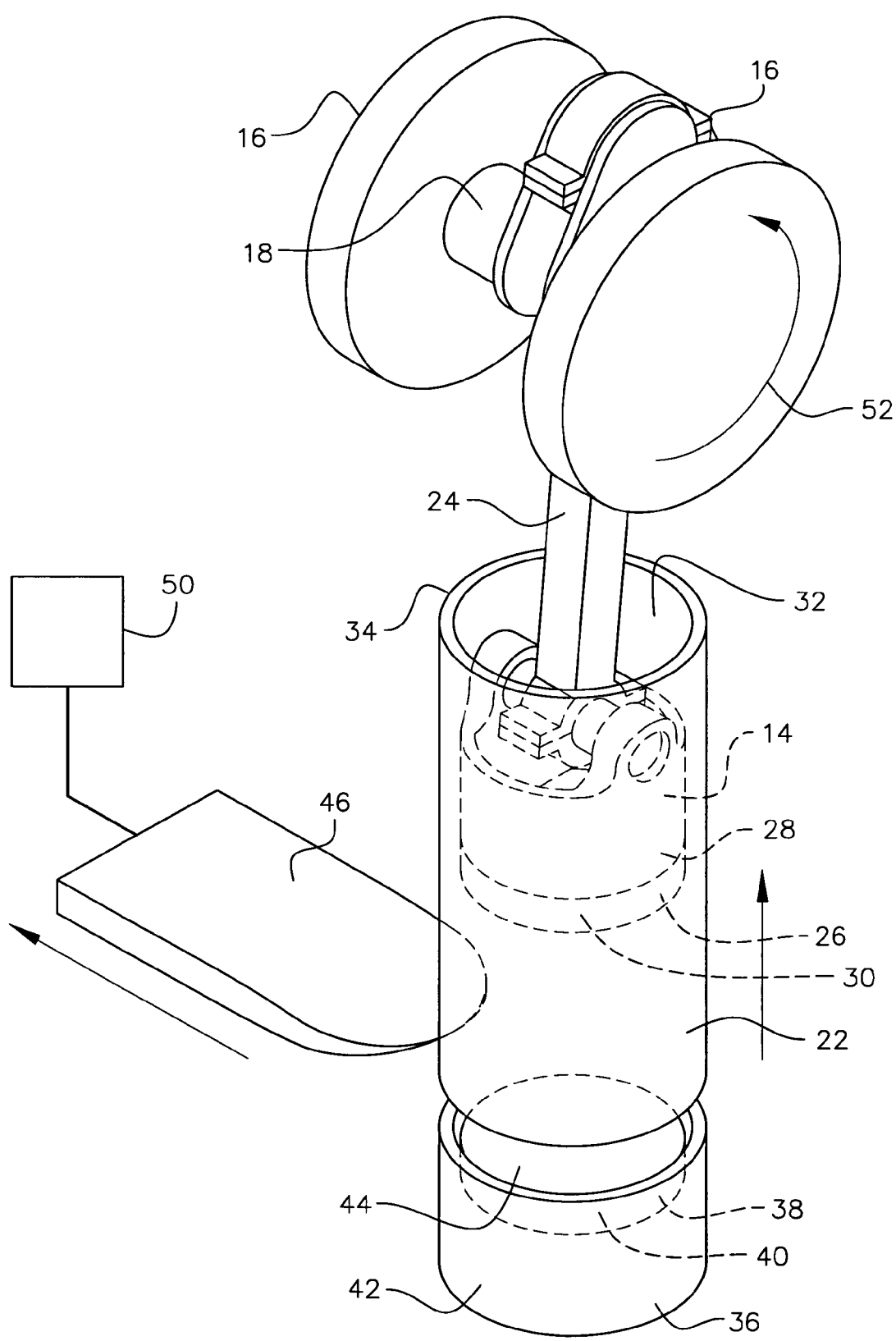
FIG. 2 is a perspective view of a piston of the present invention having the permanent magnetic head portion in proximity to another stationary permanent magnet in the cylinder whereby the slipper unit is removed (no longer interfering) between said two permanent magnets causing magnetic repulsion.

Referring now to FIGS. 1 and 2, the bottom portion of the coincident magnetic combustive energy producing apparatus 10 is shown. Apparatus 10 also includes a partial circumferential gap 44 formed in cylinder outer circumference 42 near closed top end 36. Gap 44 provides an entry area for a second slipper unit 46 to insert within second cylinder 22. It is noted that the same configuration is formed in the upper portion of coincident magnetic combustive energy producing apparatus 10 except that a first slipper unit 48 inserts within gap 44 of first cylinder 20 (see FIG. 3).

Referring now back to FIG. 3, it is shown that first and second slipper units, 48 and 46 respectively, alternately enter gaps 44 of first and second cylinders 20 and 22, respectively. Accordingly, when first slipper unit 48 is removed from gap 44 of first cylinder 20, second slipper unit 46 is inserted within gap 44 of second cylinder 22. Slipper units 46 and 48 are operated by a power and control apparatus 50. Apparatus 50 can include a solenoid and therefore be electrical or can be activated hydraulically, pneumatically or being manually operated. Apparatus 50 also can include a timing mechanism such as a clock, a cylindrical timing wheel or an IC. When a cylindrical timing wheel is employed, a 37 lbs wheel can be employed, for example, which helps carry the momentum of flywheel system 16. Further, if a timing wheel is employed, a simple electrical switch can be in contact with an outer circumference of said timing wheel and engage an elevated surface thereon to switch motors on and off to a control arm which moves the slippers, alternately, in and out of their respective gaps 44.

Referring again to FIG. 3, first and second permanent magnets, 26 and 38 respectively, in each of first and second cylinders, 20 and 22 respectively, are of like polarity. Whether they are both of a North Pole or South Pole polarity is irrelevant to the operation of coincident magnetic combustive energy producing apparatus 10, so long as respective first and second permanent magnets, 26 and 28, are of a like polarity. Since both magnets 26 and 28 are of like polarity, the magnetic field created thereby continuously repels so long as nothing interferes there between. When slippers 46 or 48 enter their respective gap 44, they interfere with the magnetic field of repulsion and magnetic attraction occurs due to slippers 46 and 48 being ferromagnetic. In the preferred embodiment, slippers 46 and 48 are made of steel. The timing mechanism of power and control apparatus 50 ensures that slippers 46 and 48 alternately enter and extract from their respective gaps 44, to cause a coincident moveable relationship of flywheel system 16. More particularly, as first piston 12 is repelling (due to no interference by slipper 48) second piston 14 is attracting due to the actual interference by slipper 46, and vice a versa. These motions move flywheel system 16 in the same direction on shaft 18 as indicated by arrow 52. And, momentum in flywheel system 16 assists in the continual movement of shaft 18 as slippers 46 and 48 continue to enter and extract from gaps 44 ensuring that any top dead center de-acceleration (the moment of least efficiency) does not occur before the next push of the coincidental operational pistons.

Figure 4:
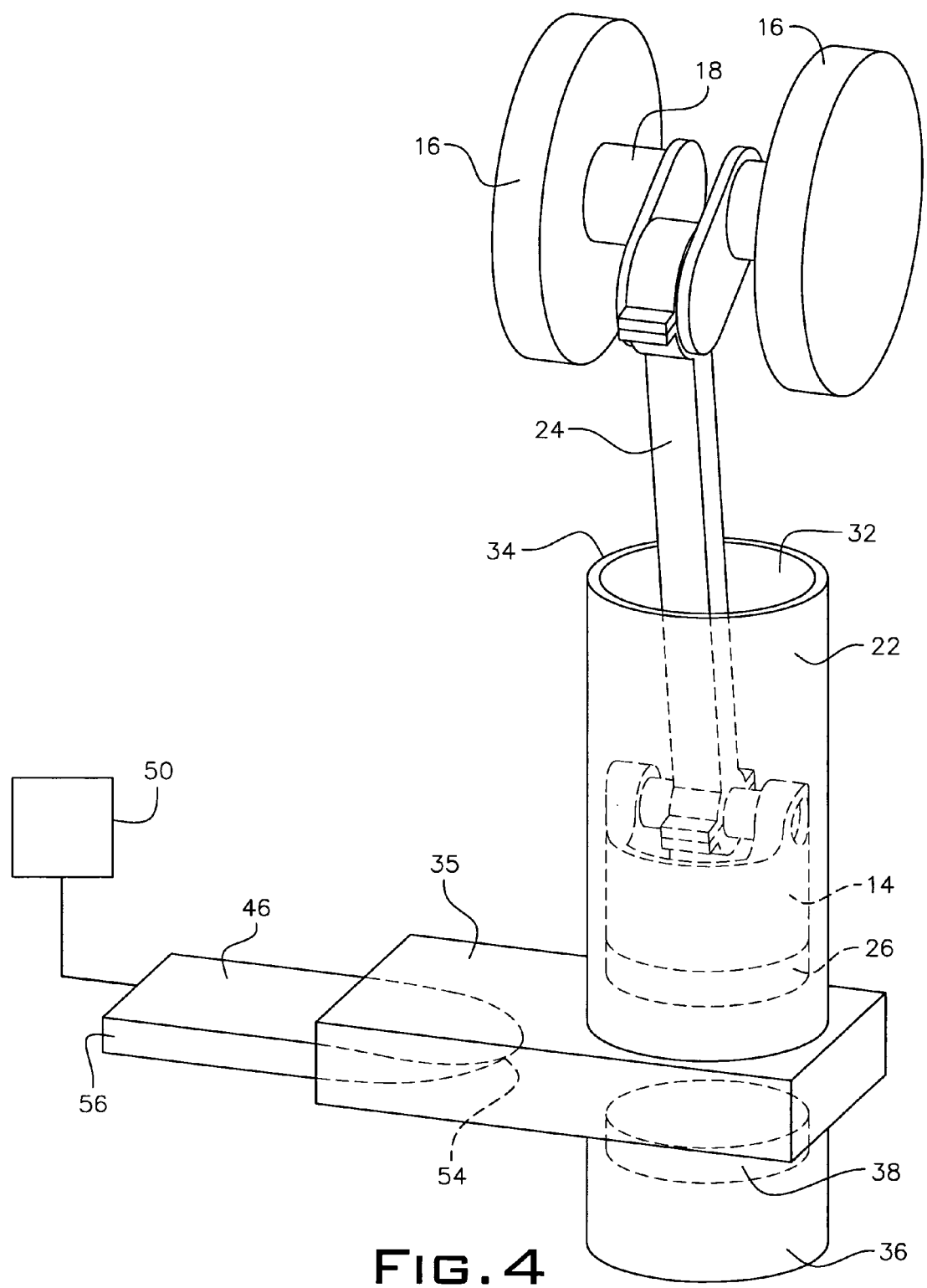
FIG. 4 is a perspective view of a slipper sleeve for guiding the slipper into a gap of the cylinder.

As shown in FIG. 4, slippers 46 and 48 have a unique shape that contributes to their function. In particular, slippers 46 and 48 have a leading edge 54 that resembles a hatchet blade. That is, leading edge 54 depends to a thin edge from its trailing edge 56, which is more "squared-off." The leading edge 54 is the edge that enters gap 44 and ensures that just before any "lock-up" can occur between one of the two permanent magnets and the slipper, the slipper can be removed by control apparatus 50 with a decrease in drag. In other words, the force needed to release a slipper from the magnetic attractive field occurring within gap 44 is lessened by the hatchet-like shape of leading edge 54. Further, the timing mechanism of control apparatus 50 also maintains slippers 46 and 48 in gaps 44 just long enough to allow pistons 12 and 14 to maximize the attractive magnetic field. And, just before any "lock-up" occurs, they are removed to provide maximum opposite thrust by repulsion since a repelling magnetic field is greatest when two magnets of like polarity are at their closest physical proximity. And hence, coincident magnetic combustion occurs. It is noted that this coincident magnetic combustion that repels the two permanent magnets of like polarity away from each other is much stronger than any gravitational forces that may try to interfere and cause the piston to fall downward.

With continuing reference to FIG. 4, a slipper sleeve 35 is provided attached to the cylinder around gap 44. Slipper sleeve 35 a slipper in entering and exiting the cylinder.

Figure 5:
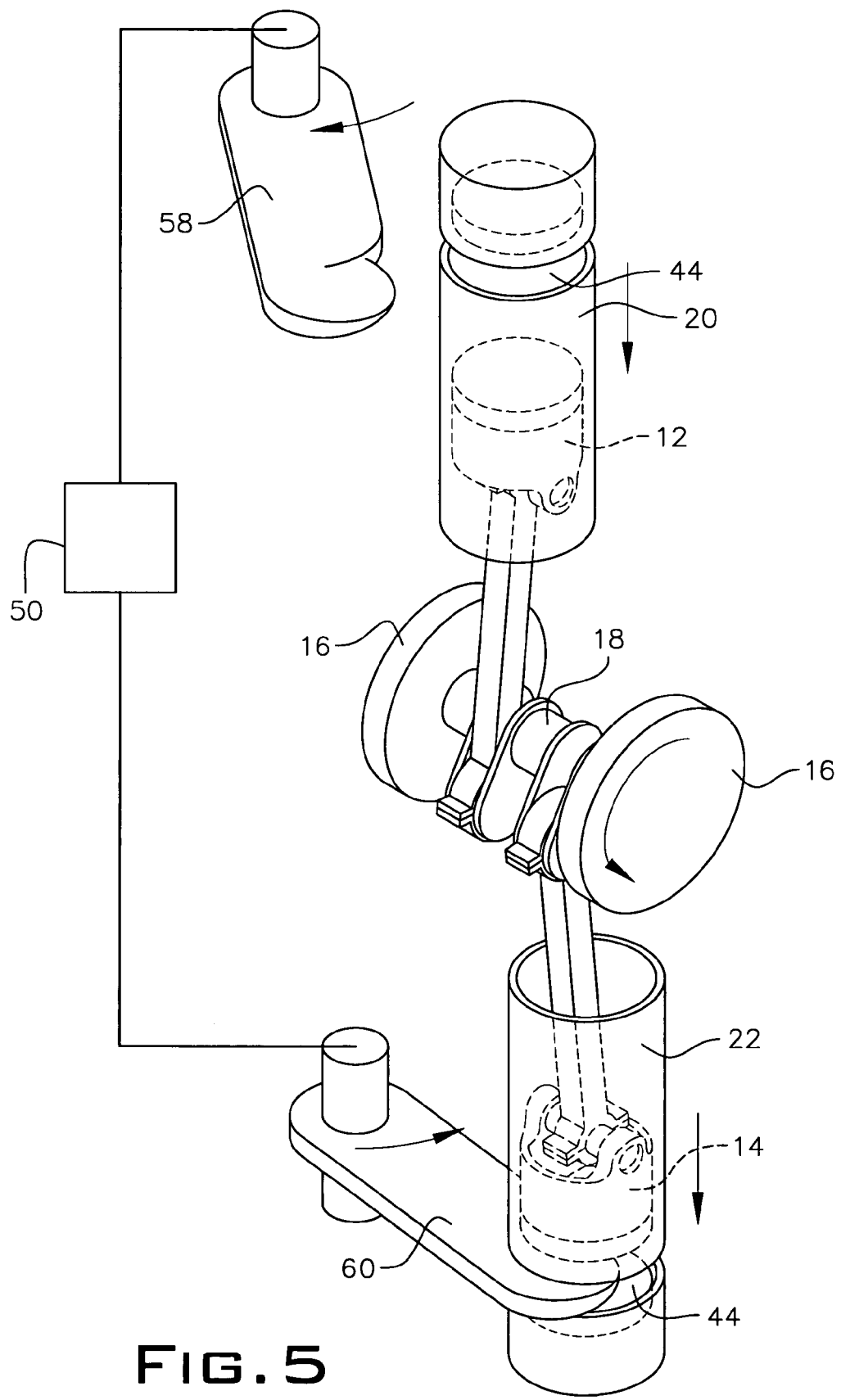
FIG. 5 is an alternate embodiment of a coincident two piston system operating like the embodiment of FIG. 3, but with different slipper units.
Figure 6:
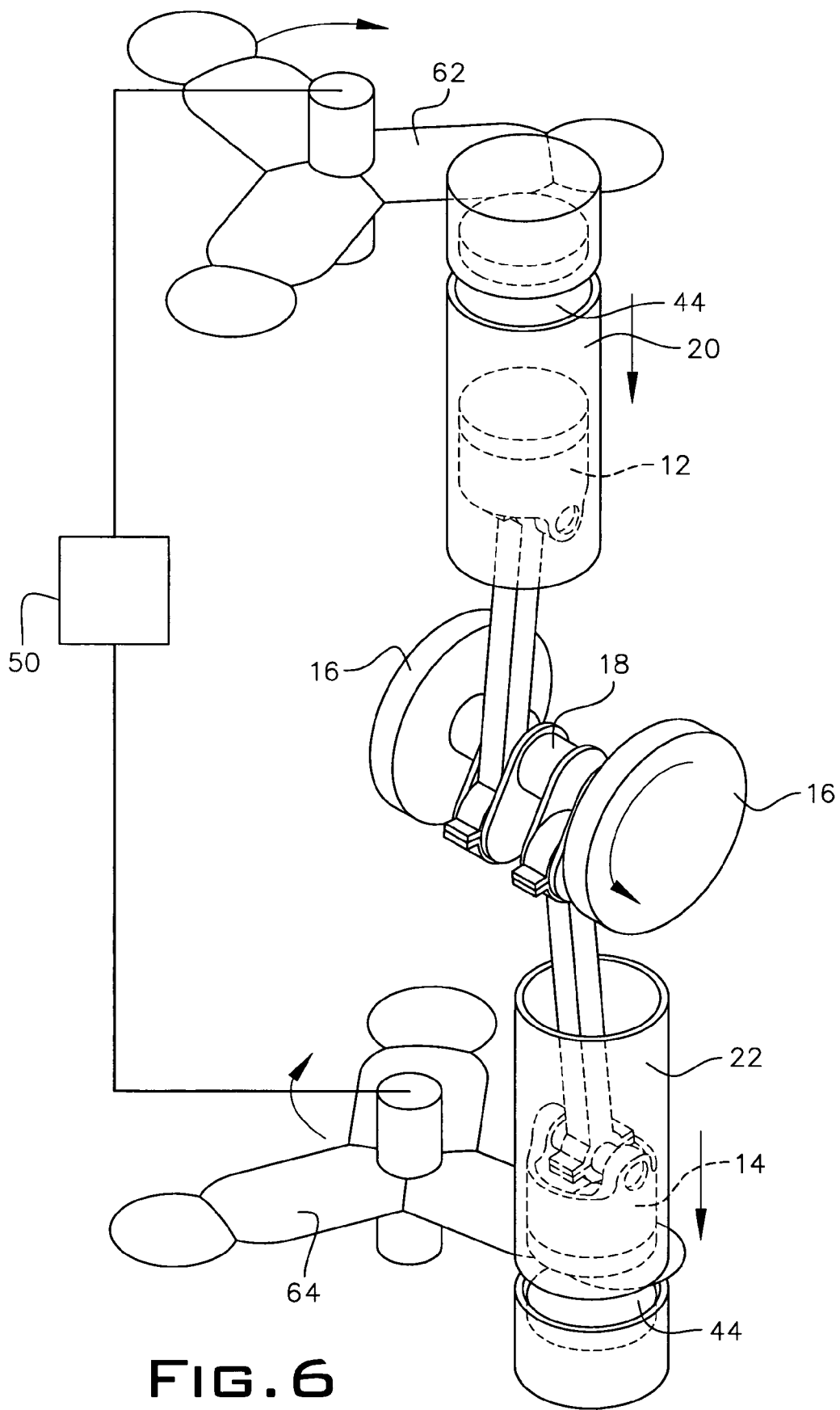
FIG. 6 is another alternate embodiment of a coincident two piston system operating like the embodiment of FIGS. 3 and 5, but with different slipper units.

Referring now to FIG. 5, a first alternate embodiment of the coincident magnetic combustive energy producing apparatus 10 is shown. The only difference in this first alternate embodiment is the shape of the slippers, 58 and 60 respectively. However, the operational principles are the same. Further, referring to FIG. 6, a second alternate embodiment of the coincident magnetic combustive energy producing apparatus 10 is shown. Again, the only difference is the shape of the slippers 62 and 64 respectively. However, notable to the second alternate embodiment is that instead of slippers 62 and 64 entering and extracting a single "blade" portion (as in the preferred or first alternate embodiment), multiple blades on a spiraling wheel enter and exit gaps 44 based upon the timing mechanism in control apparatus 50 such that a ferromagnetic blade portion of slipper 64 is entering gap 44 of second cylinder 22 while a ferromagnetic blade portion of slipper 62 is exiting gap 44 of first cylinder 20. In doing such, the coincident operation of the two pistons continues indefinitely whereby attraction is occurring in one cylinder while repulsion is occurring in the other cylinder and hence moving flywheel system 16 in the direction of arrow 52.

Figure 7:
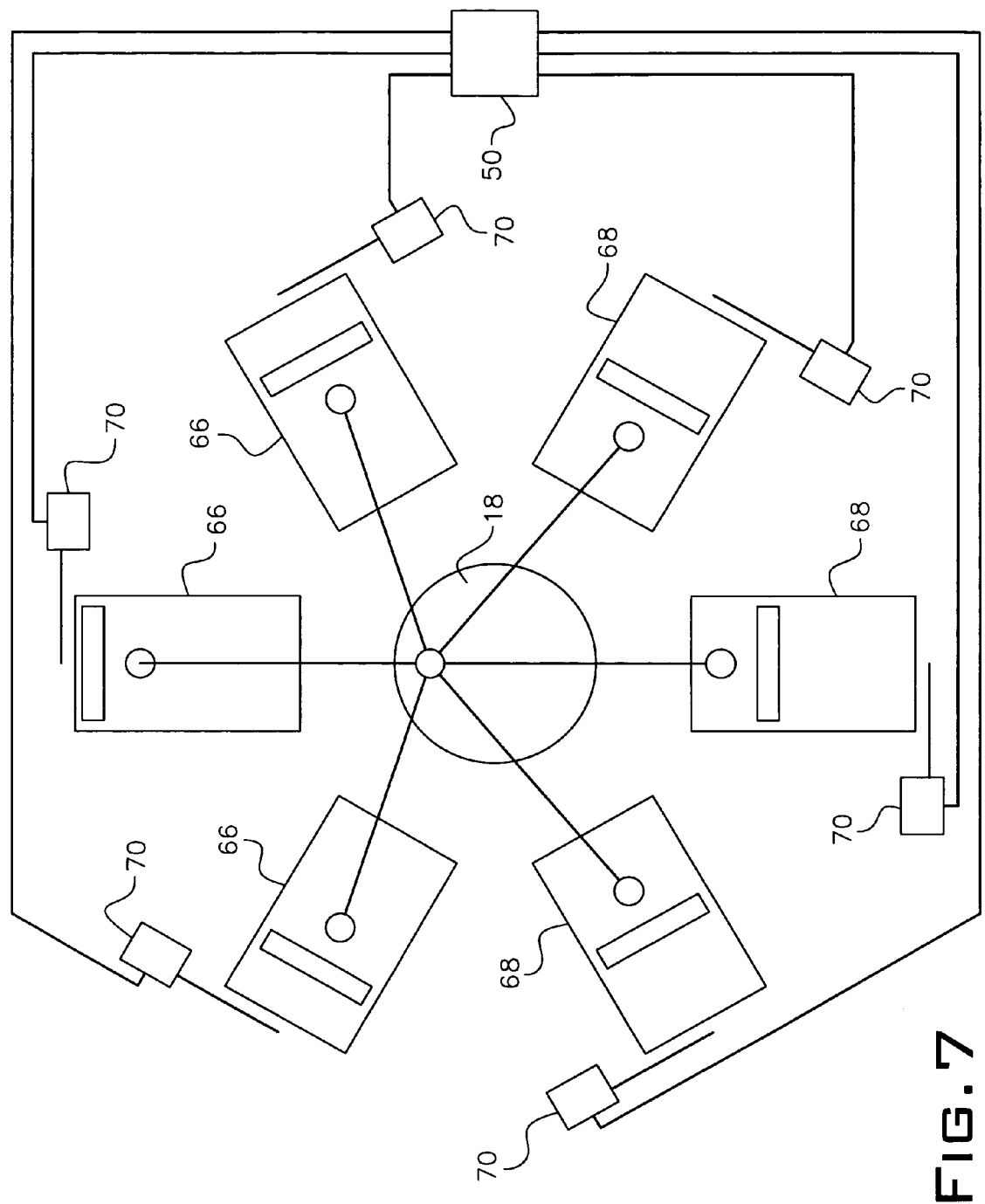
FIG. 7 is a block diagram of an energy producing apparatus utilizing a plurality of magnetic pistons of the present invention in a rotary configuration wherein each piston is operated by its own motor unit but all controlled with a single control member, two respective pistons of the plurality working in coincident.
Figure 8:
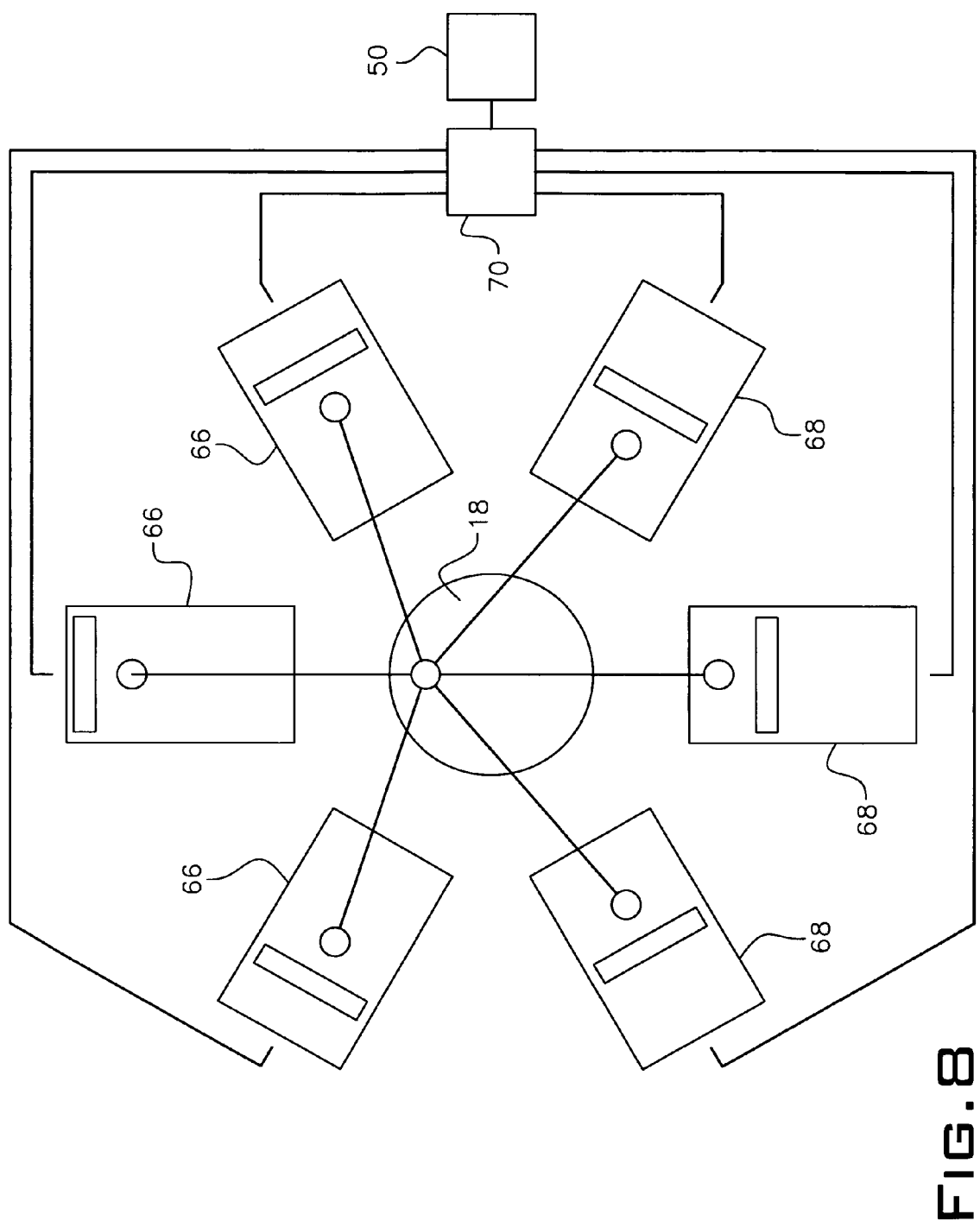
FIG. 8 is another block diagram of an energy producing apparatus utilizing a plurality of magnetic pistons of the present invention in a rotary configuration wherein all of the pistons are operated by a single motor unit and all controlled by a single control member, two respective pistons of the plurality working in coincident.

Referring now to FIG. 7, a rotary configuration for the coincident magnetic combustive energy producing apparatus 10 is shown. This configuration is similar in operation to a Gnome engine first made popular in the early part of the 20$^{th}$ Century. In such embodiment, any two opposed pistons, 66 and 68, work in coincidence as described previously. Accordingly, any of the different embodiments of slippers shown in the preferred, first or second embodiments, previously described, can be employed. However, all pistons act upon a single shaft 18. Accordingly, multiple sets of these configurations shown in FIG. 7 could be employed along one long shaft 18. In the embodiment of FIG. 7, one control apparatus 50 acts upon all piston sets which are each powered by their own power source 70. In contrast, the embodiment shown in FIG. 8, only one power source 70 is coupled to all slippers and only one control apparatus 50 provides the timing. The advantage to the embodiments of FIGS. 7 and 8 are that smaller increments of pushing power upon the flywheel system and shaft 18 can be affected at small intervals thereby providing for a smoother flowing apparatus. The embodiment of FIG. 8 can also include multiple sets of rotary configured coincident operative pistons as shown therein, that affect rotation on a single common shaft 18 thereby maximizing energy production.

With reference to both FIGS. 7 and 8, when rotary configurations are employed, timing can be very important. Accordingly, for an example, if using a six piston configuration (as shown in both FIGS. 7 and 8) is used, the coincident piston will be staggered to allow for maximum thrust. In other words, for an example, as a first coincident pair of pistons has a slipper fully in one piston and fully extracted in its opposed piston, the adjacent set may be in a state where one piston is two-thirds attracting while its opposed piston is one-third repelling and then the next adjacent piston is one third attracting while its opposed piston is two-thirds repelling. This ensures a very smooth turning shaft.

It is further noted that any of the embodiments of the present invention, shown herein, can include a battery, a starter and a generator unit as part of power and control apparatus 50 or power source 70. Further, once a small amount of power is applied to activate the slippers in any of the embodiments, the energy that is produced can be used to further the slipper movement. The energy needed is very slight and would take away from the overall energy produced, even in a simple coincident two piston embodiment. Further, as coincident operative piston sets are added, the overall energy needed to operate these added piston sets diminishes as compared to the overall aggregate energy being produced. In other words, there is an inversely proportional need for more energy to run a larger system compared to the energy produced by the coincident magnetic combustive energy producing apparatus 10.

As noted before, in the preferred embodiment, push rod 24 is attached to shaft 18 which has a flywheel system 16 (a pair of opposed flywheels attached at opposed ends of said shaft) for producing energy. However, in alternate embodiments, push rod 24 could be acting upon a multitude of different apparatuses. For example, in a single piston apparatus of the present invention, push rod 24 could be acting upon a jack to lift an object, like an automobile. Or, push rod 24 could be acting upon a hydraulic, pneumatic or electrical system to push air, move water, run motors or generators, charge alternators or batteries or rotate shafts.

Equivalent elements can be substituted for ones set forth herein to achieve the same results in the same way and in the same manner.

Having thus described the present invention in the detailed description of the preferred embodiment, what is desired to be obtained in Letters Patent is:

1. A magnetic combustive apparatus for producing energy, the apparatus comprising:
   a) at least one piston mounted within a cylinder, the piston having a distal and proximal end, the piston distal end having a first permanent magnetic mounted thereon, the piston proximal end attached to a push rod;
   b) the cylinder having an open top end and a closed bottom end, the push rod inserting through the cylinder open top end;
   c) a second permanent magnet mounted within the cylinder closed bottom end, the first and second permanent magnets have a like polarity
   d) a gap formed above the cylinder closed bottom end and second permanent magnet;
   e) a ferromagnetic slipper unit for inserting within and extracting from the cylinder gap between the first and second permanent magnets, the slipper unit interfering with a repulsive magnetic field between the first and second permanent magnets when the slipper is inserted into the cylinder gap causing the first and second permanent magnets to attract towards said slipper unit, the repulsive magnetic field re-engaging when the slipper unit is extracted from the cylinder gap causing the first and second permanent magnets to repel one another;
   f) the magnetic attraction to the slipper unit causing the at least one piston to pull downward and the magnetic repelling of the first and second permanent magnets causing the at least one piston to push upward; and
   g) means for harnessing energy as a result of the at least one piston being pushed upward and pulled downward.

2. The magnetic combustive apparatus for producing energy of claim 1, further comprising the at least one piston being at least one coincident piston set, each at least one coincident piston set including an upper and lower piston mounted in respective upper and lower cylinders and attaching to a common point on the means for harnessing energy.

3. The magnetic combustive apparatus for producing energy of claim 2, wherein both the upper and lower piston each have a slipper unit for interfering with the repulsive magnetic field between the first and second permanent magnets of each upper and lower piston, the upper slipper unit interfering with the repulsive magnetic field of the upper piston while the lower slipper unit is not interfering with the repulsive magnetic field of the lower piston, and the lower slipper unit interfering with the repulsive magnetic field of the lower piston while the upper slipper unit is not interfering with the repulsive magnetic field of the upper piston.

4. The magnetic combustive apparatus for producing energy of claim 3, wherein a power and control apparatus controls the insertion and extraction of the upper and lower slipper unit.

5. The magnetic combustive apparatus for producing energy of claim 4, wherein the power and control apparatus includes a timing mechanism.

6. The magnetic combustive apparatus for producing energy of claim 1, wherein the slipper unit has a leading and trailing edge, the leading edge having a downward depending edge from said trailing edge, the leading edge inserting into the cylinder gap.

7. The magnetic combustive apparatus for producing energy of claim 1, further comprising a slipper sleeve mounted in the cylinder gap for guiding said slipper into said gap between the first and second permanent magnets.

8. The magnetic combustive apparatus for producing energy of claim 1, wherein the means for harnessing energy comprises:
   a) a shaft attached to a top end of the push rod;
   b) a flywheel system including a pair of opposed flywheels positioned at opposite ends of said shaft;
   c) said shaft and said flywheel system turning in a single direction in response to the at least one piston being pushed and pulled.

9. The magnetic combustive apparatus for producing energy of claim 1, wherein the slipper unit rotates on a vertical axis and has a multitude of ferromagnetic blades that alternately pass through the cylinder gap.

10. The magnetic combustive apparatus for producing energy of claim 2, wherein the at least one coincident piston set is a plurality of coincident piston sets positioned in a rotary configuration whereby all pistons of said plurality of coincident sets are attached to a common shaft.

11. The magnetic combustive apparatus for producing energy of claim 10, wherein all of the plurality of coincident pistons sets have a single common power source and single common timing control.

12. The magnetic combustive apparatus for producing energy of claim 10, wherein all of the plurality of coincident pistons sets have a single common timing control and separate power sources.

13. The magnetic combustive apparatus for producing energy of claim 10, wherein a plurality of rotary configured coincident piston sets are positioned along a single common rotatable shaft.

14. A magnetic operating piston energy generating apparatus, the apparatus comprising:
   a) at least two pistons working in coincidence operating a shaft member, the at least two pistons comprising an upper and lower piston;
   b) a push rod attached to the upper and lower pistons and the shaft member;
   c) an upper cylinder enclosing the upper piston and a lower cylinder enclosing the lower piston;
   d) a first permanent magnet mounted in each of the upper and lower pistons along distal ends thereof and a second permanent magnet enclosed in each upper and lower cylinder in distal closed ends thereof, the first and second permanent magnets of like polarity;
   f) a circumferential gap formed in each of the upper and lower cylinders above the second permanent magnets; and
   g) a slipper system for alternately introducing a ferromagnetic interfering member in the gaps formed in the upper and lower cylinders, the first and second magnets of each piston and cylinder repelling one another when the ferromagnetic interfering member is removed from said gap and attracting to the ferromagnetic interfering member when inserted therein.

15. The magnetic operating piston energy generating apparatus of claim 14, further comprising a power and control assembly providing a power source and a timing element to the slipper system.

16. The magnetic operating piston energy generating apparatus of claim 14, wherein the slipper system comprises an upper and lower slipper unit, each slipper unit having a downward depending leading edge from a trailing edge, the leading edge entering the gap formed in the cylinders.

17. The magnetic operating piston energy generating apparatus of claim 14, further comprising a flywheel system attached to the shaft.

18. The magnetic operating piston energy generating apparatus of claim 14, further comprising a door member attached to each upper and lower piston for providing access to an area for receiving the first permanent magnets.

19. The magnetic operating piston energy generating apparatus of claim 14, wherein the at least two pistons comprises a plurality of upper and lower piston pairs working in coincidence and positioned in a rotary configuration along a single common shaft.

20. The magnetic operating piston energy generating apparatus of claim 19, wherein a plurality of rotary configured upper and lower coincidence pairs are positioned along the single common shaft.

* * * * *